3,495,927
PROCESS OF DYEING REGENERATED
CELLULOSE FILMS
Guy Grandsaignes d'Hauterive, Mantes-la-Jolie, France, assignor to Cellophane Investment Co. Ltd., Alderney, Channel Islands, a British corporation
No Drawing. Filed May 12, 1966, Ser. No. 549,440
Claims priority, application France, June 18, 1965, 21,313
Int. Cl. D06p 3/66
U.S. Cl. 8—4                                7 Claims

ABSTRACT OF THE DISCLOSURE

A process for the production of a dyed regenerated cellulose film without substantial loss of transparency which comprises applying to a water-swollen film of regenerated cellulose, a water-soluble or temporarily water-soluble material capable of forming an insoluble dye by the action of an oxidizing agent; applying to said water-swollen film containing said water-soluble or temporarily water-soluble material active chlorine provided by a chlorine oxidizing bath, to produce a water-insoluble dye in said water-swollen film; and subsequently drying said water-swollen film to the desired dyed regenerated cellulose film.

---

The present invention is directed to a process for dyeing of regenerated cellulose films and more particularly to a process of producing an insoluble dyeing utilizing a single additional dye vat.

Numerous processes are known for dyeing regenerated cellulose films to produce an insoluble dyeing. For example, a conventional process comprises incorporating pigments in viscose, which gives rise to the cellulose film. By such a process, however, a considerable proportion of the transparency, which is one of the essential qualities of desired product, is lost, and, thus, the process is not one that can be employed to great advantage.

It is also known to cause the formation of pigments within the film itself by causing therein the reaction of two or more pigment components. In this manner, with certain precautions, the film can be dyed in an insoluble way without its transparency being substantially reduced. To do this, the film is made to pass, during formation, into a vat containing a soluble product in solution and then, after careful drying, into a second vat containing a reagent which gives rise to an insoluble pigment by reaction with the soluble product of the preceding vat. It is possible, for example, to color a cellulose film yellow by the formation of an insoluble dye of cadmium sulfide, by making it pass successively into a bath containing a cadmium salt, and then into a bath containing an alkaline sulfide. Many similar analogous examples can be cited.

However, this process is quite delicate to carry out. Besides the vats each containing reaction products, it is necessary to have washing vats, since the liquid of the first bath must not be even partially carried into the second, for the second bath would be rapidly dirtied by the formation of the colored precipitate that would be formed there. This, in addition to the need for multiple dye vats, therefore, is a distinct disadvantage of this prior process.

Also, an attempt has been made to cause the formation of pigments by using a single vat, where one of the components is incorporated in the viscose or where the vat contains a product that can form an insoluble dye with the cellulose, as is the case, for example, of a solution of potassium permanganate which dyes the film brown by forming insoluble pigments of manganese oxides. This process, however, has been found suitable only in some very limited cases and for a very small number of dyes, and, thus, has not been found commercially practical.

It has now been found, however, that by the process of the present invention, wherein a material which can form an insoluble dye under the action of oxidizing reagent and a chlorine oxidizing agent are employed, an insoluble dyeing of a regenerated cellulose film can be prepared without any apparent significant loss of transparency.

It is, therefore, a principal object of the present invention to provide a simple process for producing an insoluble dyeing of a regenerated collulose film, which process is free from the inherent deficiencies and disadvantages of previously employed processes.

It is a further object of the present invention to provide a process for dyeing regenerated cellulose films by which process no apparent loss of transparency results.

It is yet a further object of the present invention to provide a process for dyeing regenerated cellulose film wherein a single additional dyeing vat is employed.

Yet a further object of the present invention is to provide a process for dyeing regenerated cellulose film wherein a material which can form an insoluble dye under the action of an oxidizing agent and a chlorine oxidizing agent are employed as the dyeing medium.

Still further objects and advantages of the process of the present invention will become more apparent from the following more detailed description of the invention.

By the present invention, it is possible to dye cellulose films, utilizing an extremely broad range of dyes, in an insoluble manner and without altering their transparency, using a single additional vat for this purpose. The present invention consists in utilizing, as the reagent for forming the insoluble pigments, the chlorine oxidizing bath which is ordinarily used in machines for making regenerated cellulose films to oxidize the last traces of sulfur-containing compounds carried by the film and to bleach the later.

In previous processes, where the formation of dyes is made by passage of the film into two successive vats, these vats are arranged downstream from the chlorine oxidizing vat. Most of the dyes are actually sensitive to the action of the chlorine and the latter must be eliminated by vigorous rinsing. According to the process of the present invention, however, a single dyeing vat is used which immediately precedes the chlorine oxidizing vat. Therefore, it is closer to the zone where the film coagulates, which favors penetration of the dye elements into the latter. The dye vat can also be placed immediately following the chlorine oxidizing vat, although placement before the chlorine oxidation vat as described above is preferred.

The chlorine bath which is employed in the process of the present invention does not differ from the baths ordinarily used, the chlorine yield having merely to be sufficient to assure the formation of the dye at the same time as its normal bleaching and purifying functions.

However, there should not be too great excess of active chlorine, so that the oxidation thus brought about does not destroy the dye that has been formed. It is possible, for example, to use sodium hypochlorite baths, which are in current use.

A considerable number of products or mixtures of products can be chosen to dye the cellulose films according to the process of the present invention. In general, the invention extends to all products capable of forming an insoluble dye by the action of an oxidizing reagent. Suitable examples include reduced vat dyes, reduced sulfur dyes, aniline derivatives, indigo derivatives, azoic dyes, oxyazoic pigments, leuco derivatives of vat dyes, and mixtures of such materials.

Thus, a suitable material is primuline, an azoic dye which is found under No. 49,000 in the second edition of the Color Index. This material forms a clear yellow color in solution, but gives rise to a dark yellow insoluble pigment after oxidation in the chlorine oxidizing bath.

Reduced forms of vat dyes, sulfur dyes and other similar dyes, as stated previously, can also be used within the scope of the present invention. Oxidation of such dyes by chlorine regenerates the insoluble pigment in the film.

The use of the reduced and stabilized forms of these dyes is preferred, since their use is easier. This is the case, for example, with "Indigosol" dyes whose general formula is found under No. 59051 A of the Color Index.

It is also possible to use dyes which are formed by oxidation of aniline derivatives. A very large number of shades can be obtained, especially from aromatic amines or aminophenols, for example, paraphenylene diamine.

Insoluble pigments, which are made soluble temporarily by oxidizable bodies under the action of chlorine, can also be used. This is the case, for example, with indigo derivatives made soluble by sodium bisulphite. Mixtures of naphthols and aromatic diazoics treated with sodium sulfite can also be used. These diazoics react on naphthol to form an azoic dye only if an oxidizer restores to them their aptitude for reacting.

Ordinary diazoic compounds can be mixed with naphthols or other couplers which are made soluble and which have temporarily lost the possibility of coupling as the result of a treatment with formol and sodium bisulfite. The oxidation treatment produced by the chlorine oxidizing bath regenerates the naphthol or the coupler which immediately acts on the diazoic compound to form a dye. Similarly, dyes used for textile printing, whose pigments are regenerated and which are made insoluble by the action of stream, a treatment which can be replaced, are within the framework of the invention, since they are made temporarily soluble by oxidation in the hypochlorite bath. This is the case, for example, of insoluble oxyazoics, made soluble by alkaline bisulfites and insoluble again by steam.

It is also possible to mix several dyes from one or more of the above types, which fact makes it possible to increase the variety of shades that the present invention makes it possible to obtain. A very great number of mixtures can thus be prepared, provided that the affinity of the elements of the mixtures for one another, and also their ionic characters, which should possibly by harmonized by the addition of compatibilizing agents, are kept in mind.

In addition, leuco derivatives of vat dyes whose oxidation in air is slow or difficult and whose use has required, up to now, the addition of an additional oxidation vat, can also be used within the framework of the present invention without need of such special oxidation vat. The range of utilizable dyes can be further widened by a great variety of mixtures of leuco derivatives and their reducing agents. It is also possible to mix them with a dye such as primuline, a material which is slightly sensitive to the action of reducing agents.

Between the bath which contains the first reaction product, i.e., the material that will form an insoluble dye under the action of an oxidizing agent, and the chlorine oxidizing bath, it is usually necessary to provide a doctoring of the film or a fuller operation in order to prevent substantial carrying of liquid from one bath to another. This doctoring is similar to that employed where two vats of dye material are utilized in order to prevent the formation of dirty deposits in the second vat. In the present invention, however, the problem of deposit formation in the second vat is lessened, since the oxidizing properties of the chlorine oxidizing bath tend to eliminate such impurities as formed.

The following examples illustrate various embodiments of the present invention. It is to be understood that these examples are for purposes of illustration only and the present invention is not to be limited thereto.

EXAMPLE I

In a conventional machine for making cellulose films by the viscose process, a regenerated cellulose film, which has not yet undergone complete drying and consequently is swollen by water, was passed into a vat containing an aqueous solution of primuline, brought to a boil.

This film, which when dried weighed 30 grams per square meter, passed through this solution of primuline of 15 grams per liter in 10–15 seconds. On coming out of this bath, the film passed into a fuller which energetically eliminated the excess of the primuline bath that has been carried along. The film then passed, for another 10–15 seconds, through a vat containing sodium hypochlorite in the proportion of one or two grams of active chlorine per liter. An orange yellow dye, insoluble in water, was formed in the film. The film then passed into the regular washing vats and into vats containing softening agents before being dried under normal conditions. The dyeing was found to be insoluble and no significant decrease in transparency was observed.

EXAMPLE II

Following the procedure of Example I, a regenerated cellulose film was passed into a vat containing a heated aqueous solution of 5 grams per liter of concentrated "Bleu Sandozol o" of Societe Sandoz, a sulfuric leuco ester of indigo, numbered 73002 in the Color Index. A transparent blue dye resulting from the regeneration of the indigo was formed under the same conditions as Example I in the chlorine bath that immediately followed this dye vat.

EXAMPLE III

Following the procedure of Examples I and II, a film was passed into a bath containing paraphenylene diamine dissolved in hot water in a proportion of 10 grams per liter. An insoluble dye of a brown shade, known as Brun de Paramine [Paramine brown] was formed in the film in the chlorine bath which was adjacent the dye vat.

EXAMPLE IV

Following the procedure of Example I, a film was passed into a heated bath containing 15 grams of primuline and 5 grams of concentrated "Bleu Sandozol o." After passing through the chlorine oxidizing vat, a green shade dye resulting from the juxtaposition of yellow and blue dyes, which were formed by each of the constituents, was obtained. Again, the dyeing was found to be insoluble, and no decrease in transparency was observed.

EXAMPLE V

A regenerated cellulose film was passed for 15 seconds through a dye bath at 70° C. containing a solution of 2 gr. per liter of vat dye water "Ecarlate Heliane F2 JN" of Societe Francolor, a dye found under No. 73,860 of the Color Index, and which had been previously reduced to the state of a leuco derivate, according to the ordinary process, by sodium hyposulfite in the presence of caustic soda.

After drying between two doctors, the film was passed through the chlorine vat which contained 2–3 grams of active chlorine per liter. The cellulose film was dyed pale rose. The dyeing was insoluble and without any loss in transparency.

A pale rose coloring of the film was also obtained under the same conditions and with the same concentration of "Rose brillant Solanthrene FR" of the Societe Francolor, a dye found under No. 73,360 of the Color Index.

While certain embodiments of the present invention have been described by way of specific example, it is to be understood that the invention is not to be deemed as limited thereto, but should be construed as broadly as all or any equivalents thereof.

What is claimed is:
1. In a process for producing a regenerated cellulose film from viscose comprising coagulating a viscose solu- tion to form a gel; treating said gel with a chlorine oxidizing agent; and drying said treated gel to form the final film, the improvement which comprises applying to said gel prior to said drying and while still in the form of a water-swollen film, a water-soluble or temporarily water-soluble material capable of forming an insoluble dye by the action of an oxidizing agent and applying to said gel, active chlorine provided by a chlorine oxidizing bath so as to produce said water insoluble dye by reaction with said material capable of forming an insoluble dye by the action of an oxidizing agent, whereby a dyed film is produced having no apparent loss of transparency.

2. The process of claim 1 wherein said chlorine oxidizing bath comprises an aqueous solution of sodium hypochlorite.

3. The process of claim 1 wherein said soluble or temporarily soluble material capable of forming an insoluble dye by the action of an oxidizing agent is selected from the group of reduced vat dyes, reduced sulfur dyes, aniline derivatives, indigo derivatives, azoic dyes, oxyazoic pigments, leuco derivatives of vat dyes, and mixtures of such materials.

4. The process of claim 3 wherein the soluble or temporarily soluble material capable of forming an insoluble dye by the action of an oxidizing agent is primuline.

5. The process of claim 3 wherein the soluble or temporarily soluble material capable of forming an insoluble dye by the action of an oxidizing agent is a sulfuric leuco ester of indigo.

6. The process of claim 3 wherein the soluble or temporarily soluble material capable of forming an insoluble dye by the action of an oxidizing agent is paraphenylene diamine.

7. The process of claim 3 wherein the soluble or temporarily soluble material capable of forming an insoluble dye by the action of an oxidizing agent comprises a mixture of primuline and a sulfuric leuco ester of indigo.

References Cited

UNITED STATES PATENTS

| | | | |
|---|---|---|---|
| 1,350,600 | 8/1920 | Fourneaux | 8—32 |
| 2,418,605 | 4/1947 | Shepherd et al. | 8—4 |
| 3,083,068 | 3/1963 | Weber et al. | 8—35 |

OTHER REFERENCES

Venkataraman: "Chemistry of Syn. Dyes," Academic Press Inc. 1952, pp. 877–878.

NORMAN G. TORCHIN, Primary Examiner

J. E. CALLAGHAN, Assistant Examiner

U.S. Cl. X.R.

8—32, 35